(12) United States Patent
Krishnan et al.

(10) Patent No.: US 10,302,744 B1
(45) Date of Patent: May 28, 2019

(54) SENSOR ASSEMBLY

(71) Applicant: Ford Global Technologies, LLC, Dearborn, MI (US)

(72) Inventors: Venkatesh Krishnan, Canton, MI (US); Rashaun Phinisee, Ypsilanti, MI (US); James Pizzimenti, Carleton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/903,296

(22) Filed: Feb. 23, 2018

(51) Int. Cl.
| | |
|---|---|
| *B60R 11/04* | (2006.01) |
| *G01S 7/481* | (2006.01) |
| *G01S 17/02* | (2006.01) |
| *B60R 9/04* | (2006.01) |
| *G01S 17/88* | (2006.01) |
| *B60R 11/00* | (2006.01) |

(52) U.S. Cl.
CPC .............. *G01S 7/4813* (2013.01); *B60R 9/04* (2013.01); *G01S 17/026* (2013.01); *G01S 17/88* (2013.01); *B60R 11/04* (2013.01); *B60R 2011/004* (2013.01)

(58) Field of Classification Search
CPC ......... B60R 2011/004; B60R 2011/005; B60R 9/04; B60R 11/04; B60K 31/0008
See application file for complete search history.

(56) References Cited

U.S. PATENT DOCUMENTS

| | | | | |
|---|---|---|---|---|
| 3,689,695 | A * | 9/1972 | Rosenfield | B60R 1/00 348/148 |
| 4,413,451 | A * | 11/1983 | Featherstone | B60Q 1/2657 277/553 |
| 4,868,577 | A * | 9/1989 | Wingard | H01Q 1/3275 343/713 |
| RE36,245 | E * | 7/1999 | Stanuch | B60Q 1/2611 340/472 |
| 6,547,205 | B2 * | 4/2003 | Carter | B60R 11/04 248/550 |
| 6,582,105 | B1 * | 6/2003 | Christensen | B60Q 1/2657 340/12.5 |
| 7,448,812 | B2 * | 11/2008 | Heibel | B60R 11/04 396/419 |
| 8,137,008 | B1 * | 3/2012 | Mallano | B60R 11/04 396/427 |
| 8,228,177 | B1 * | 7/2012 | Yamada | B60R 25/104 340/426.1 |
| 9,446,721 | B2 * | 9/2016 | Jagoda | B60R 11/04 |

(Continued)

FOREIGN PATENT DOCUMENTS

| | | |
|---|---|---|
| CN | 105699985 A | 6/2016 |
| CN | 206217814 U | 6/2017 |
| CN | 107128255 A | 9/2017 |

*Primary Examiner* — Jeffrey J Restifo
(74) *Attorney, Agent, or Firm* — Frank A. MacKenzie; Bejin Bieneman PLC

(57) ABSTRACT

A vehicle includes a roof and a housing having a bottom surface sealed to the roof. The vehicle includes a base in the housing and having a first surface sealed to the roof, a second surface opposite the first surface, and a duct extending from the first surface to the second surface. The vehicle includes a navigation sensor supported by the second surface. The vehicle includes a wire in electrical communication with the navigation sensor and extending through the duct.

19 Claims, 7 Drawing Sheets

(56) References Cited

U.S. PATENT DOCUMENTS

| | | | | |
|---|---|---|---|---|
| 9,509,357 B2* | 11/2016 | Marshall | ............... | H04B 1/3888 |
| 9,553,357 B2* | 1/2017 | Taeger | ................. | H01Q 1/1214 |
| 9,802,656 B1* | 10/2017 | Williams | ............... | B62D 35/00 |
| 9,849,836 B2* | 12/2017 | Minikey, Jr. | ............ | B60R 11/04 |
| 9,885,526 B2* | 2/2018 | Maranville | ............... | F25B 1/00 |
| 9,919,748 B2* | 3/2018 | Williams | ............... | B62D 35/00 |
| 10,046,713 B2* | 8/2018 | Maranville | ............... | B60R 9/04 |
| 2011/0249204 A1* | 10/2011 | Hamilton | ................. | G09F 21/04 |
| | | | | 348/837 |
| 2012/0154521 A1* | 6/2012 | Townsend | .......... | H04N 5/23238 |
| | | | | 348/36 |
| 2012/0249366 A1* | 10/2012 | Pozgay | ............. | H04B 7/18571 |
| | | | | 342/354 |
| 2014/0028507 A1* | 1/2014 | Mierke | ................ | H01Q 1/1214 |
| | | | | 343/713 |
| 2017/0190300 A1* | 7/2017 | Maranville | ............... | B60R 9/04 |
| 2017/0261273 A1* | 9/2017 | Maranville | ............... | F25B 1/00 |

* cited by examiner

SENSOR ASSEMBLY

BACKGROUND

A vehicle may include one or more object detection sensors such as Light Detection and Ranging (LIDAR) sensors, cameras, etc., to detect objects, e.g., in an area outside the vehicle. A sensor for detecting objects outside a vehicle may be mounted to a vehicle exterior. For example, a sensor may be mounted to a vehicle roof, pillar, etc. Alignment of such sensors relative to the vehicle aids in detecting a position of detected objects relative to the vehicle. The sensors may be part of a sensor assembly. Testing of various sensors, e.g., types of sensors, and various types of sensor assembly components, e.g., types of lenses, aids in optimizing performance of the sensor assembly.

DETAILED DESCRIPTION

Figure 1:
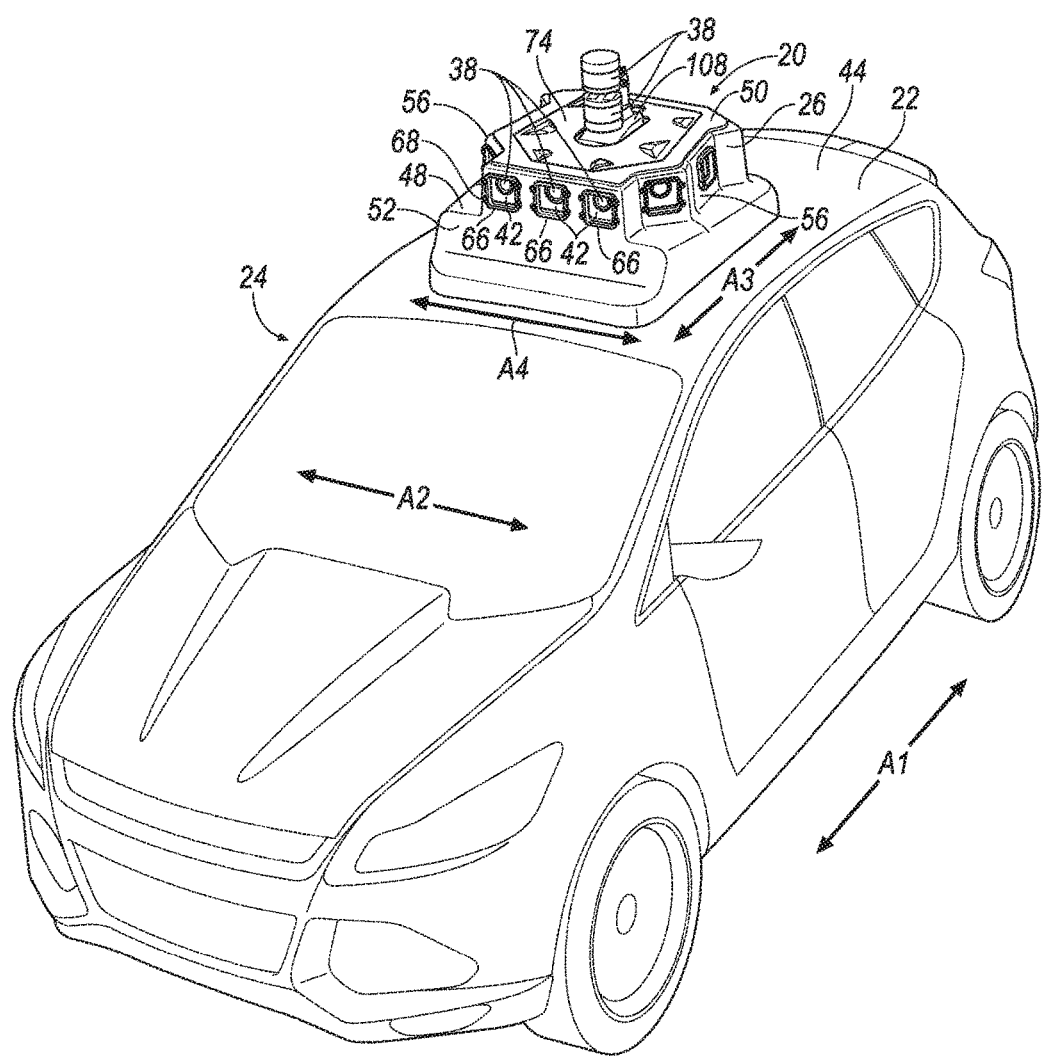
FIG. 1 is a perspective view of a vehicle with a sensor assembly.

A vehicle includes a roof and a housing having a bottom surface sealed to the roof. The vehicle includes a base in the housing. The base has a first surface sealed to the roof, a second surface opposite the first surface, and a duct extending from the first surface to the second surface. The vehicle includes a navigation sensor supported by the second surface. The vehicle includes a wire in electrical communication with the navigation sensor and extending through the duct.

The roof may include an exterior panel, and the housing and the base may be sealed to the exterior panel.

The housing may define an opening and include a lens releasably secured over the opening, the navigation sensor may be positioned to receive light through the lens.

The housing may include a main body that defines an opening at a top of the housing, and a top panel sealed to the main body about a perimeter of the opening at the top of the housing.

The base may be monolithic.

The vehicle may include a sensor plate supporting the navigation sensor and fixed to the second surface of the base.

The housing may include a main body that defines an opening at a rear of the housing, and a rear panel secured to the main body and sealed to the main body about a perimeter of the opening at the rear of the housing.

The roof may define a hole, and the wire may extend through the hole.

An assembly includes a housing designed to seal to a vehicle roof. The assembly includes a base in the housing and having a first surface and a second surface opposite the first surface, the base defining a duct extending from the first surface to the second surface, the first surface designed to seal to the vehicle roof about a perimeter of the duct. The assembly includes a navigation sensor supported by the second surface.

The base may include a bottom portion elongated along a longitudinal axis and having the first surface, and a first wall and a second wall elongated along a lateral axis and extending transversely from the bottom portion and spaced from each other.

The base may include a support rib extending between the bottom portion and the first wall.

The base may include a first middle portion and a second middle portion spaced from each other and extending along the longitudinal axis between the first wall and the second wall.

The first wall, the second wall, the first middle portion and the second middle portion may define the duct.

The first middle portion may include an outer surface and define a cavity extending from the outer surface toward the duct.

The cavity may terminate prior to the duct.

The bottom portion may define a first width and the first wall may define a second width that is the same as the first width.

The housing may include a main body that defines an opening at a top of the housing, and a top panel sealed to the main body about a perimeter of the opening at the top of the housing.

The assembly may include a second navigation sensor supported by the base, and the top panel may define an opening, the second navigation sensor extending through the opening.

The housing may define an opening and include a lens releasably secured over the opening.

The assembly may include a wire in electrical communication with the navigation sensor and extending through the duct.

With reference to the Figures, wherein like numerals indicate like parts throughout the several views, a sensor assembly 20 for a roof 22 of a vehicle 24 includes a housing 26 having a bottom surface 28 sealed to the roof 22. The sensor assembly 20 includes a base 30 in the housing 26 and having a first surface 32 sealed to the roof 22, a second surface 34 opposite the first surface 32, and a duct 36 extending from the first surface 32 to the second surface 34. The sensor assembly 20 includes a navigation sensor 38 supported by the second surface 34. The sensor assembly 20 includes a wire 40 in electrical communication with the navigation sensor 38 and extending through the duct 36. The sensor assembly 20 provides a robust frame work for testing various navigation sensors 38, lenses 42, etc.

The sensor assembly 20 may be supported by the roof 22 of the vehicle 24. The sensor assembly 20 may be fixed to the roof 22, e.g., via fasteners, clips, suction, adhesive, etc.

The vehicle 24 may be any passenger or commercial automobile such as a car, a truck, a sport utility vehicle, a crossover vehicle, a van, a minivan, a taxi, a bus, etc.

Figure 2:
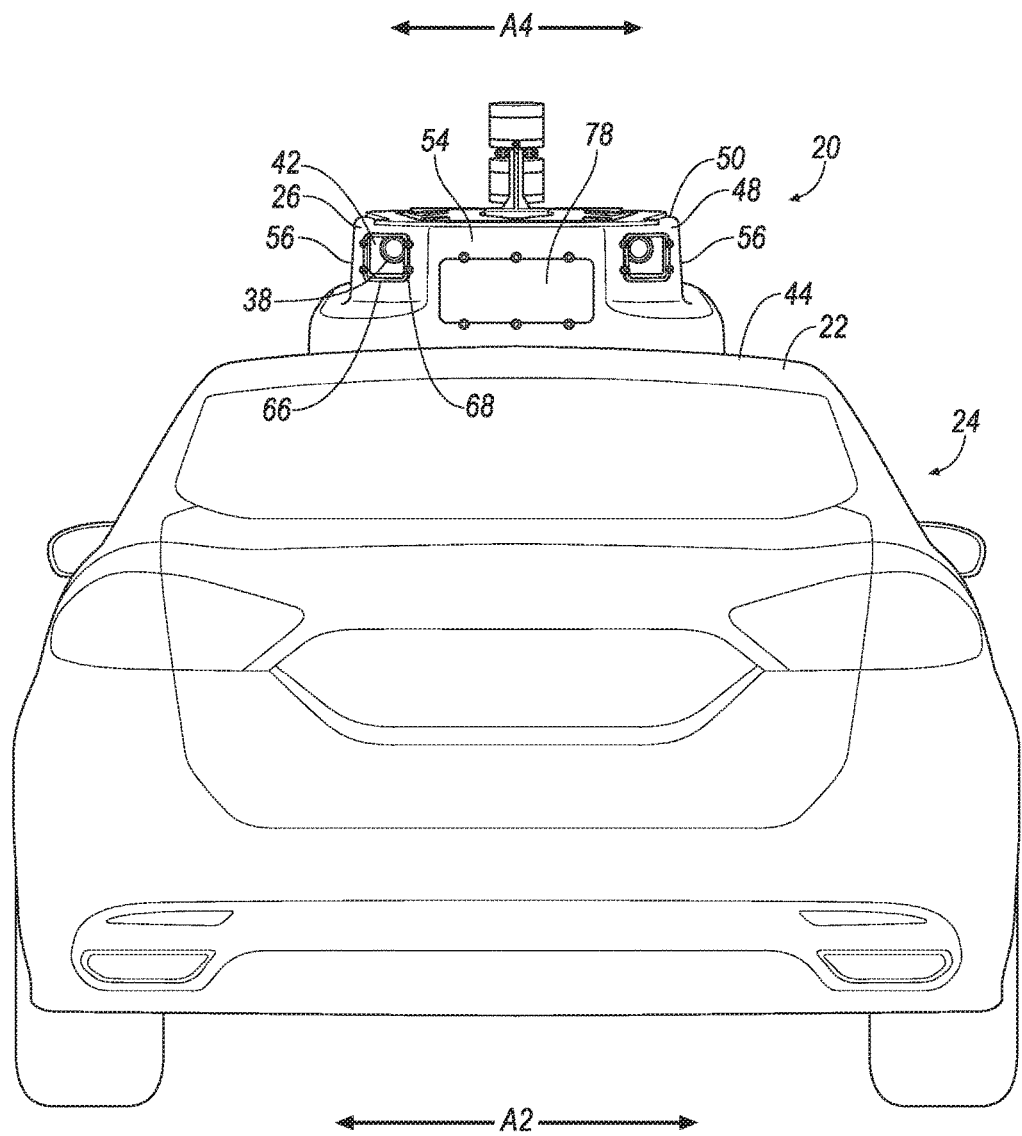
FIG. 2 is a rear view of the vehicle with the sensor assembly.
Figure 3:
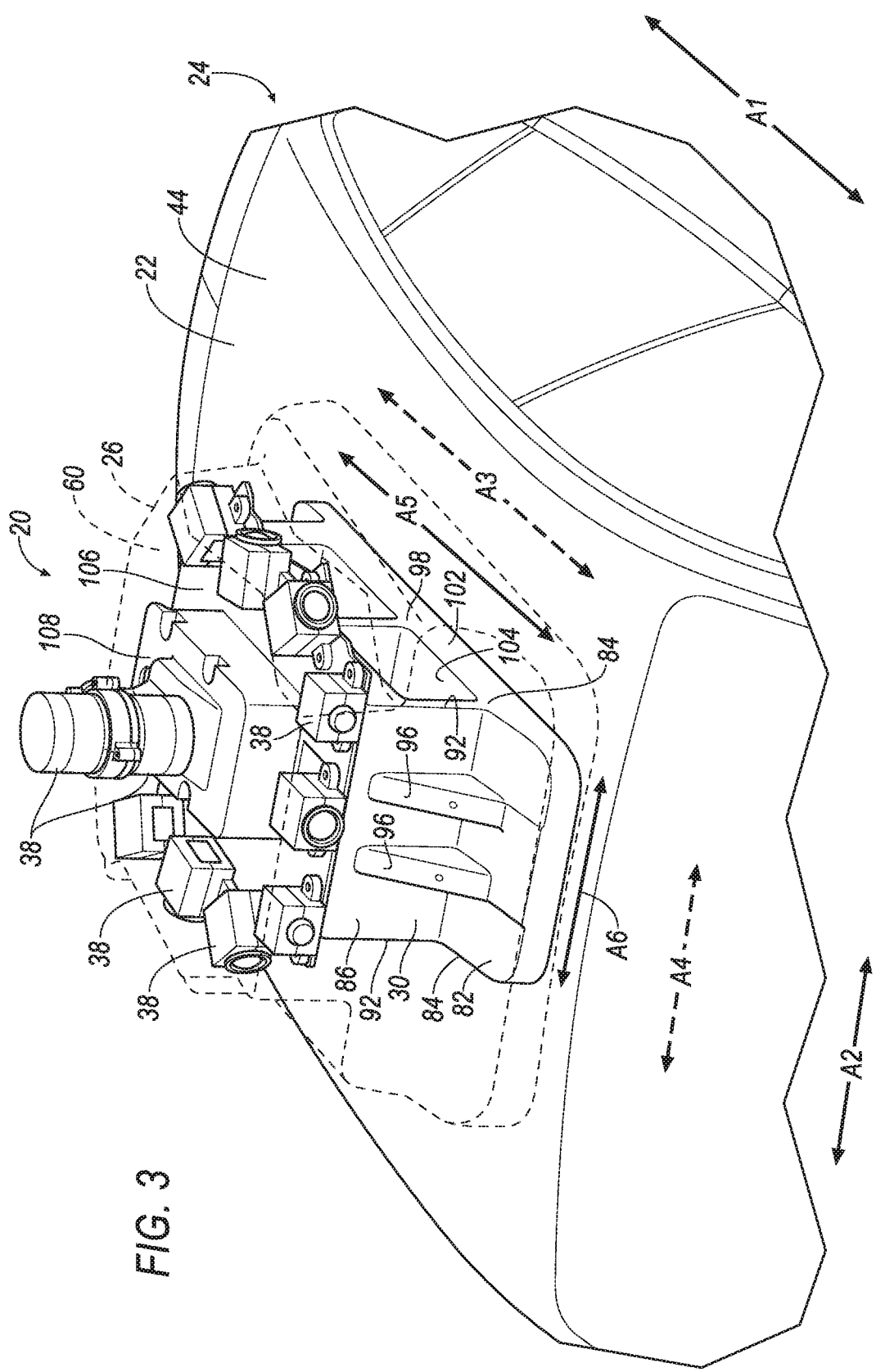
FIG. 3 is a perspective view of the vehicle with the sensor assembly.

With reference to FIGS. 1-3, the vehicle 24 defines a vehicle-longitudinal axis A1, i.e., extending between a front and a rear of the vehicle 24. The vehicle 24 defines a cross-vehicle axis A2, i.e., extending between a left side and a right side of the vehicle 24. The vehicle-longitudinal axis A1 and the cross-vehicle axis A2 may be perpendicular to each other. The directions front, rear, left, and right may be relative to an orientation of an operator of the vehicle 24. The directions front, rear, left, and right may be relative to an orientation of controls for operating the vehicle 24, e.g., an instrument panel, etc. The directions front, rear, left, and right may be relative to a forward driving direction when wheels of the vehicle 24 are all parallel with each other.

The roof 22 of the vehicle 24 provides cover and protection to occupants of the vehicle 24. The roof 22 may include an internal panel, an exterior panel 44, and a headliner 45. The internal panel provides support to the exterior panel 44, the headliner 45, etc. The internal panel may be steel, aluminum, carbon fiber, or any other suitable material. The headliner 45 and the exterior panel 44 provide class-A surfaces to the roof 22, i.e., surfaces specifically manufactured to have a high-quality, finished aesthetic appearance free of blemishes, etc. The roof 22 may define a hole 46, shown in FIGS. 4 and 5. For example, the hole 46 may be defined in the exterior panel 44, e.g., providing access to between the exterior panel 44 and the headliner 45. The roof 22 may define a contour, e.g., of the class-A surface of the exterior panel 44 along the vehicle-longitudinal axis A1 and the cross-vehicle axis A2.

The vehicle 24 may include a computer (not shown). The computer may operate the vehicle 24 in an autonomous mode, a semi-autonomous mode, or a non-autonomous mode. For purposes of this disclosure, an autonomous mode is defined as one in which each of vehicle 24 propulsion, braking, and steering are controlled by the computer; in a semi-autonomous state the computer controls one or two of vehicle 24 propulsion, braking, and steering; in a non-autonomous state, a human operator controls the vehicle 24 propulsion, braking, and steering.

The computer may use information from one or more navigation sensors 38, when operating the vehicle 24 at in various modes. The information may be received via a communication bus (not shown) or the like of the vehicle 24.

The housing 26 protects other components of the sensor assembly 20, e.g., the navigation sensors 38, etc. The housing 26 may include a main body 48 having a top portion 50, a front portion 52, a rear portion 54 opposite the front portion 52, and a pair of opposing side portions 56. The bottom surface 28 of the housing 26 may be a bottom edge 58 of the front portion 52, the rear portion 54, and the opposing side portions 56.

The housing 26 may define a longitudinal axis A3 extending between the front portion 52 and the rear portion 54. The housing 26 may define a lateral axis A4 extending between the pair of opposing side portions 56. The longitudinal axis A3 may be perpendicular to the lateral axis A4. The longitudinal axis A3 may be parallel to the vehicle-longitudinal axis A1, and the lateral axis A4 may be parallel to the cross-vehicle axis A2, e.g., when the housing 26 is supported by the roof 22 of the vehicle 24. The housing 26 may be plastic or any other suitable material.

The housing 26 may define a chamber 60, e.g., between the front portion 52, the rear portion 54, the top portion 50, and the opposing side portions 56. The bottom surface 28 may define an opening 61 that provides access to the chamber 60 opposite the top portion 50.

The housing 26 may be designed to seal to the roof 22 of the vehicle 24. For example, the bottom surface 28 of the housing 26 may define a contour, e.g., about the bottom edge 58 of the housing 26, that is complementary to the contour of the roof 22. As another example, the bottom surface 28 may have a smooth finish sufficient to inhibit flow of fluid between the bottom surface 28 and the exterior panel 44 of the roof 22, e.g., when the sensor assembly 20 is supported by the roof 22 and the bottom surface 28 abuts the exterior panel 44. As another example, the bottom surface 28 may include a gasket 62, e.g., rubber, silicone, polytetrafluoroethylene (otherwise known as PTFE or Teflon), plastic polymer, etc.

The bottom surface 28 of the housing 26 may be sealed to the roof 22 of the vehicle 24. The bottom surface 28 of the housing 26 may be sealed to the exterior panel 44 of the roof 22. The bottom surface 28 may be sealed to the roof 22 about the hole in the roof 22. The bottom surface 28 may be sealed to the roof 22 about the base 30. For example, the bottom surface 28 of the housing 26 may abut the exterior panel 44 and prohibit fluid flow therebetween. The gasket 62 may abut the roof 22, e.g., to aid in providing the seal. The class-A surface of the exterior panel 44 may provide a sufficiently smooth finish to enable the seal.

Figure 4:
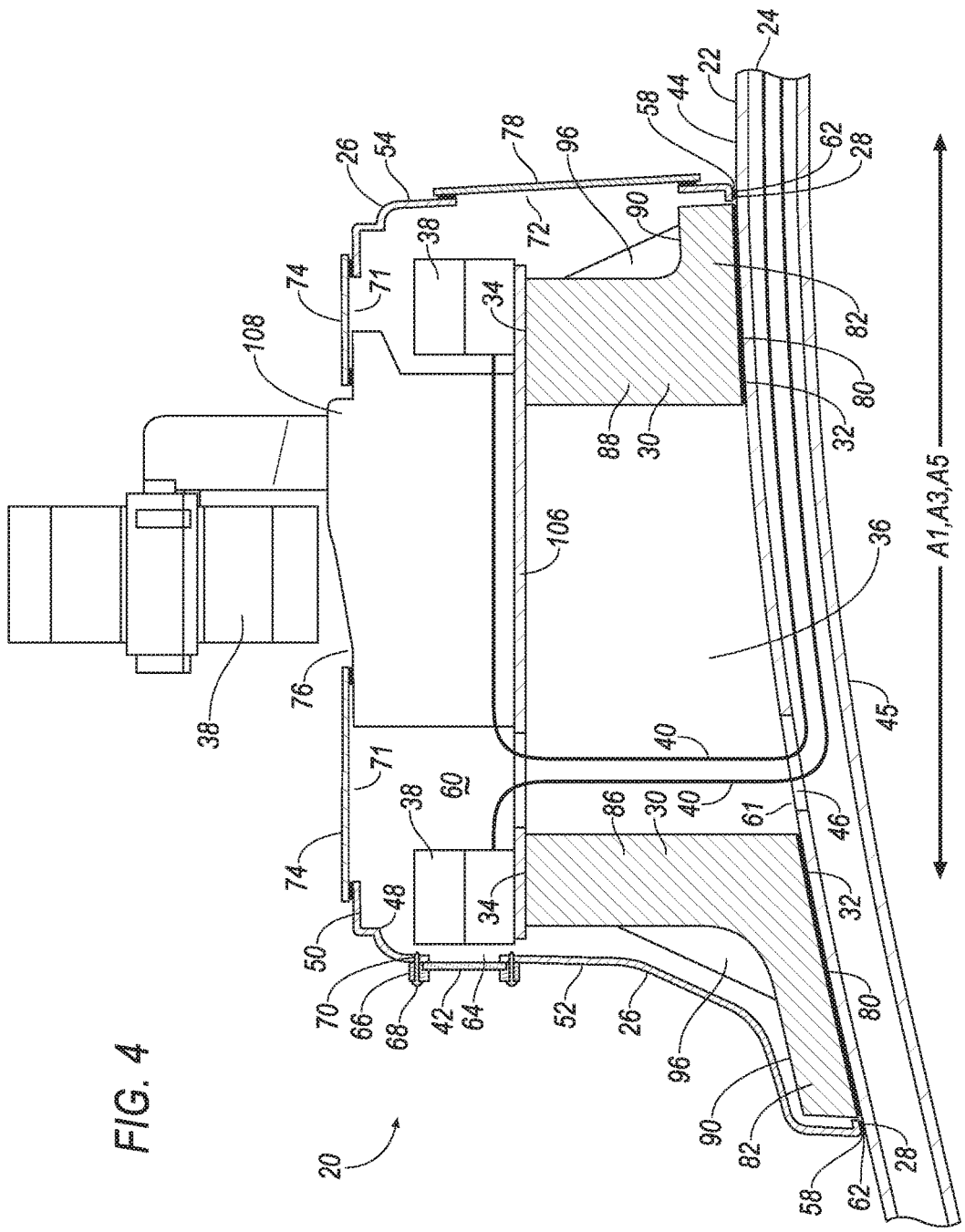
FIG. 4 is a cross section of a portion of the vehicle with the sensor assembly taken along a vehicle-longitudinal axis.
Figure 5:
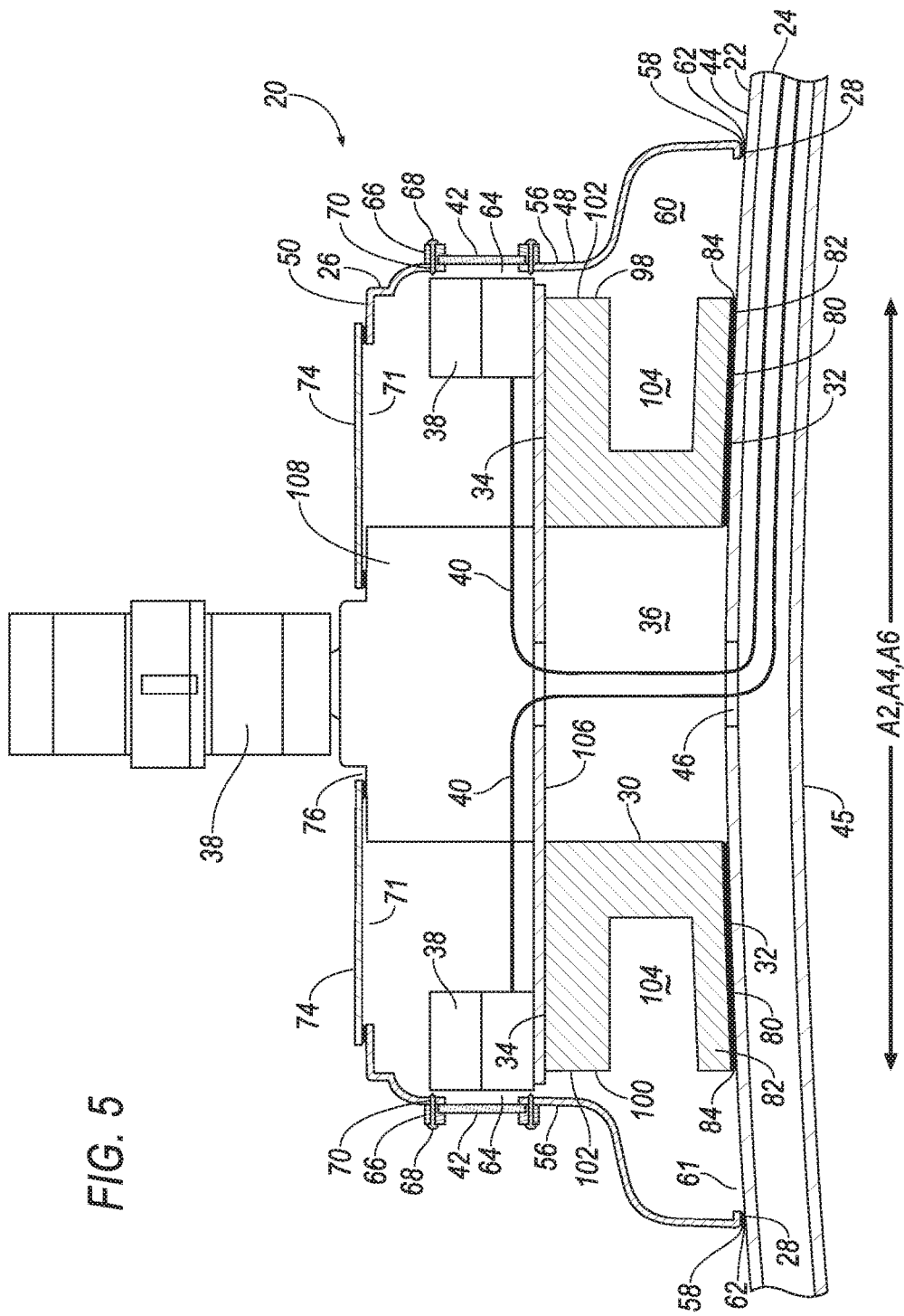
FIG. 5 is a cross section of the vehicle with the sensor assembly taken along a cross-vehicle axis.
Figure 7:
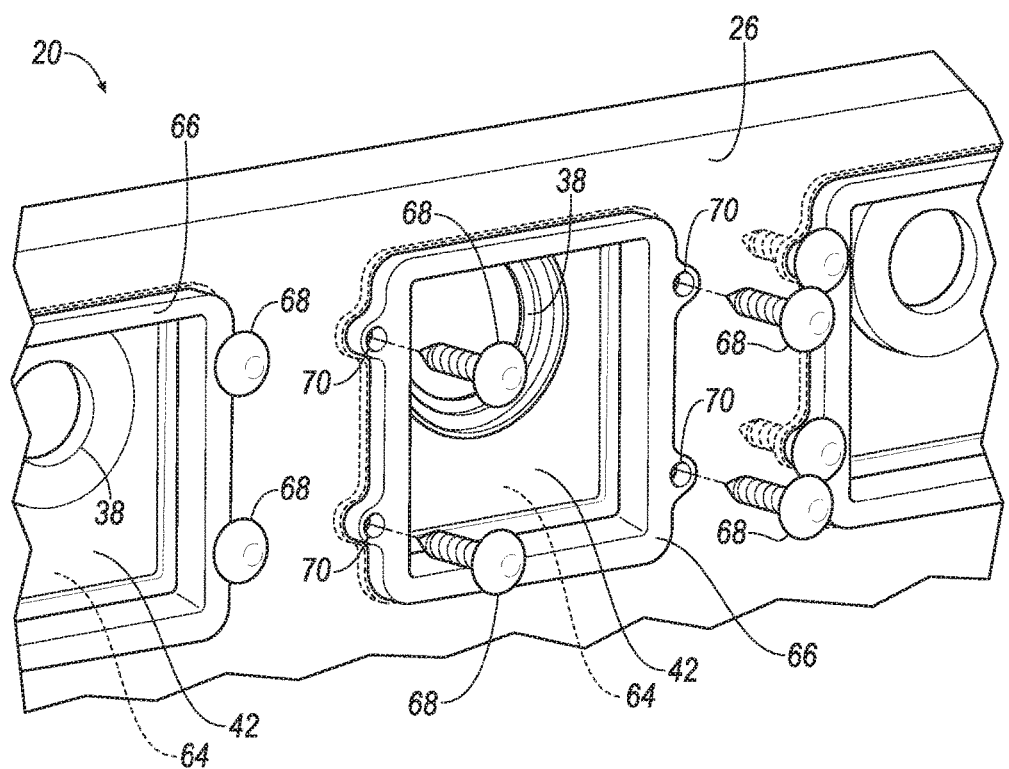
FIG. 7 is a perspective view of a lens and a bezel of the sensor assembly.

The housing 26 may define one or more sensor openings 64, shown in FIGS. 4, 5, and 7. For example, the sensor openings 64 may be defined in the main body 48, e.g., in the front portion 52, the rear portion 54, the side portions 56, etc. The sensor openings 64 permit light to pass therethrough, e.g., to be detected by the navigation sensors 38.

The housing 26 may include one or more lenses 42. The lenses 42 protect the navigation sensors 38 and prohibit fluid and contaminants from entering the chamber 60 through the sensor openings 64. Each lens 42 may be releasably secured over one of the sensor openings 64. For example, the lenses 42 may be releasably secured to the main body 48. As used herein, releasably secured means that the lenses 42 may be secured to, and released from such securement, without damaging the main body 48 or the lens 42. For example, the housing 26 may include one or more bezels 66 that surround each of the lenses 42 and are fixed to the main body 48 with one or more push pins 68. The push pins 68 may be received by holes 70 in the main body 48, e.g., with a friction fit. The lenses 42 being releasably secured enables one or more the lenses 42 to be removed and replaced with a different lens 42, e.g., such that different types of lenses 42 may be used with the sensor assembly 20, e.g., lenses 42 of different materials, having different coatings, etc.

The housing 26 may define an access opening 71 in the top portion 50 of the main body 48, show in FIGS. 4 and 5. The housing 26 may define an access opening 72 in the rear portion 54 of the main body 48, shown in FIG. 4. The access openings 70, 72 provide access to the chamber 60, e.g., so that the navigation sensors 38 may be serviced and/or replaced.

The housing 26 may include a top access panel 74. The top access panel 74 protects the navigation sensors 38 and prohibits fluid and contaminants from entering the chamber 60. The top access panel 74 covers the access opening 71 in the top portion 50 of the main body 48, e.g., the top access panel 74 may be sealed to the main body 48 about a perimeter of the access opening 71 in the top portion 50 of the main body 48, e.g., with a gasket therebetween, by a surface of the top access panel 74 abutting the top portion 50, etc. The top access panel 74 may be secured to the main body 48, e.g., with a fastener, a clip, etc. The top access panel 74 may define an opening 76. The opening 76 permits one of the navigation sensors 38 to extend outside of the housing 26.

The housing 26 may include a rear access panel 78. The rear access panel 78 protects the navigation sensors 38 and prohibits fluid and contaminants from entering the chamber 60. The rear access panel 78 covers the access opening 72 in the rear portion 54 of the main body 48, e.g., the rear access panel 78 may be sealed to the main body 48 about a perimeter of the access opening 72 in the rear portion 54 of the main body 48, e.g., with a gasket therebetween, by a surface of the rear access panel 78 abutting the rear portion 54, etc. The rear access panel 78 may be secured to the main body 48, e.g., with a fastener, a clip, etc.

The base 30 provides a rigid support structure for the navigation sensors 38, and other components of the sensor assembly 20. The design of the base 30 enables an alignment of the navigation sensors 38 to be maintained, e.g., as the vehicle 24 navigates a bumpy road, is subject various accelerations, e.g., turning, increasing or decreasing speed, etc., while also minimizing weight of the sensor assembly 20 to reduce possible negative effects on performance of the vehicle 24, e.g., gas mileage, center of gravity, etc. The base 30 may be plastic, such as nylon, or any suitable material. The base 30 may be in the housing 26. For example, the base 30 may be in the chamber 60 of the housing 26, e.g., when the sensor assembly 20 is supported by the roof 22 of the vehicle 24.

The base 30 may define a longitudinal axis A5. The base 30 may define a lateral axis A6 extending. The longitudinal axis A5 may be perpendicular to the lateral axis A6. The longitudinal axis A5 may be parallel to the vehicle-longitudinal axis A1 and the longitudinal axis A3 of the housing 26, and the lateral axis A6 may be parallel to the cross-vehicle axis A2 and the lateral axis A4 of the housing 26, e.g., when the housing 26 and the base 30 are supported by the roof 22 of the vehicle 24.

The first surface 32 of the base 30 may be designed to seal to the roof 22 of vehicle 24 about a perimeter of the duct 36. For example, the first surface 32 of the base 30 may define a contour, e.g., about the perimeter of the duct 36, that is complementary to the contour of the roof 22. As another example, the first surface 32 may have a smooth finish sufficient to inhibit flow of fluid between the first surface 32 and the exterior panel 44 of the roof 22, e.g., when the sensor assembly 20 is supported by the roof 22 and the first surface 32 abuts the exterior panel 44. As another example, the first surface 32 may include a gasket 80, e.g., rubber, silicone, polytetrafluoroethylene (otherwise known as PTFE or Teflon), plastic polymer, etc.

The first surface 32 of the base 30 may be sealed to the roof 22 of the vehicle 24. The first surface 32 of the base 30 may be sealed to the exterior panel 44 of the roof 22. The first surface 32 surface may be sealed to the roof 22 about the hole 46 in the roof 22. For example, the first surface 32 of the base 30 may abut the exterior panel 44 of the roof 22 and prohibit fluid flow therebetween. The gasket 80 may abut the exterior panel 44 of the roof 22, e.g., to aid in providing the seal. The class-A surface of the exterior panel 44 may provide a sufficiently smooth finish to enable the seal.

The second surface 34 of the base 30 supports components of the sensor assembly 20, e.g., the navigation sensors 38. The second surface 34 is opposite the first surface 32.

The base 30 may include a bottom portion 82. The bottom portion 82 may be elongated along the longitudinal axis A5 of the base 30. The bottom portion 82 may have the first surface 32. The bottom portion 82 may define a width W1, e.g., along the lateral axis A5 of the base 30, shown in FIG. 6. The width W1 of the bottom portion 82 may be between opposing side edges 84 of the bottom portion 82. The bottom portion 82 may be rectangular.

The base 30 may include a first wall 86 and a second wall 88. The first wall 86 and the second wall 88 may be elongated along the lateral axis A6 of the base 30. The first wall 86 and the second wall 88 may extend transversely from the bottom portion 82. The first wall 86 and the second wall 88 may extend upward from the bottom portion 82, e.g., from a surface 90 of the bottom portion 82 opposite the first surface 32. The first wall 86 and the second wall 88 may be spaced from each other, e.g., along the longitudinal axis A5 of the base 30. The first wall 86 and the second wall 88 may be rectangular.

Figure 6:
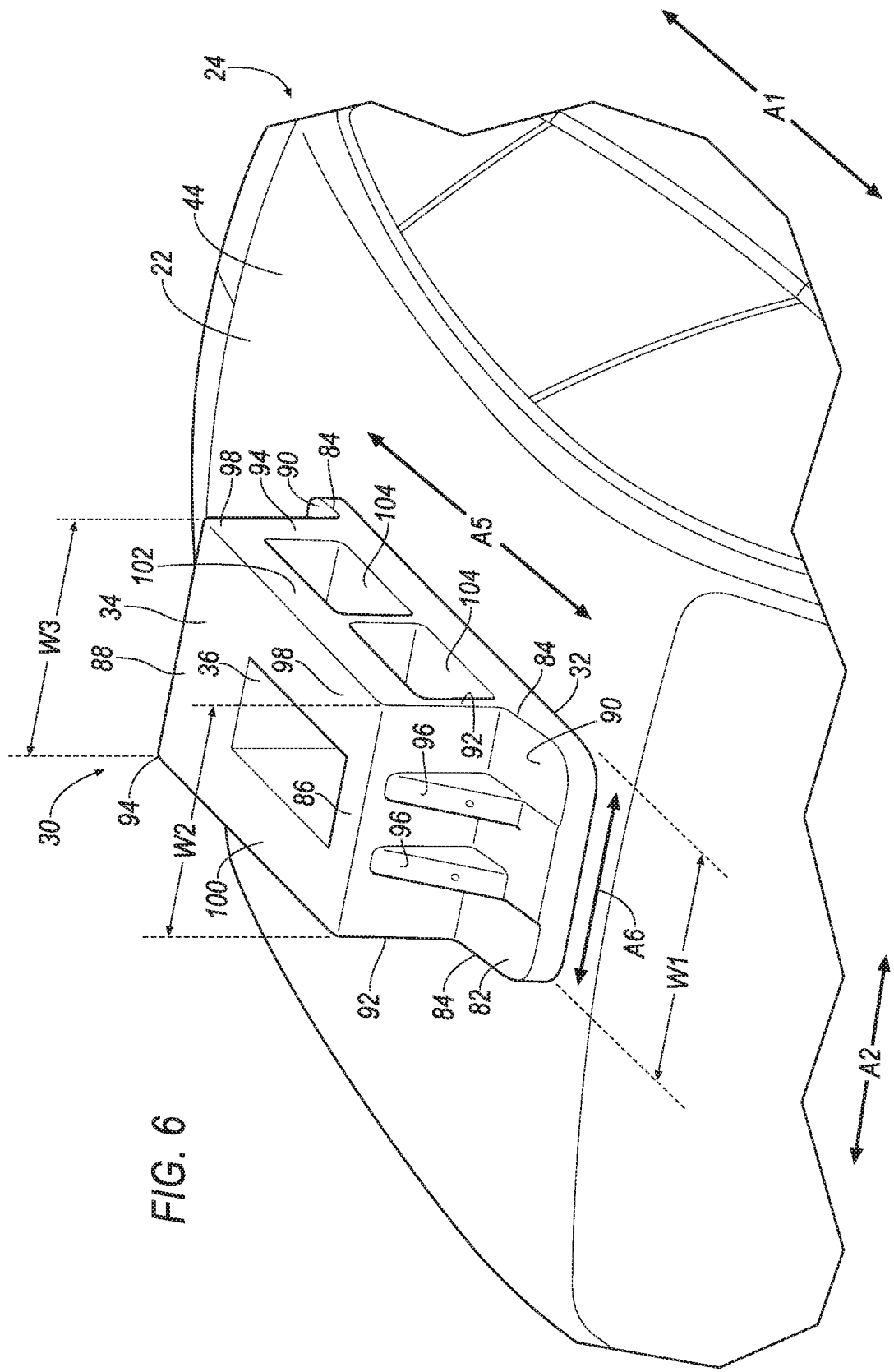
FIG. 6 is a perspective view of the vehicle and a base of the sensor assembly.

The first wall 86 defines a width W2, shown in FIG. 6. The width W2 of the first wall 86 may be along the lateral axis A6 of the base 30. The width W2 of the first wall 86 may be between opposing side edges 92 of the first wall 86. The width W2 of the first wall 86 may be the same as the width W1 of the bottom portion 82. The second wall 88 defines a width W3, shown in FIG. 6. The width W3 of the second wall 88 may be between opposing side edges 94 of the second wall 88. The width W3 of the second wall 88 may be the same as the width W1 of the bottom portion 82. To put it another way, the first wall 86 and the second wall 88 may each extend between the side edges 84 of the bottom portion 82.

The base 30 may include one or more support ribs 96. The support ribs 96 may extend transversely from the bottom portion 82. The support ribs 96 may extend upward from the bottom portion 82. The support ribs 96 may extend between the bottom portion 82 and the first wall 86. The support ribs 96 may extend between the bottom portion 82 and the second wall 88. The support ribs 96 may be rectangular.

The base 30 may include a first middle portion 98 and a second middle portion 100. The middle portions 98, 100 may extend between the first wall 86 and the second wall 88. The middle portions 98, 100 may extend along the longitudinal axis A5 of the base 30. The middle portions 98, 100 may be spaced from each other, e.g., along the lateral axis A6 of the base 30. The middle portions 98 may be rectangular.

The first middle portion 98 and the second middle portion 100 may each include an outer surface 102. The outer surfaces 102 may be opposite the duct 36 on each of the middle portions 98, 100. The middle portions 98 may each define a cavity 104. The cavities 104 may extend from the outer surfaces 102 toward the duct 36. The cavities 104 terminate prior to the duct 36. To put it another way, the cavities 104 may be open at the outer surfaces 102 and not open to the duct 36.

The base 30 defines the duct 36. The duct 36 extends from the first surface 32 to the second surface 34. The duct 36 may be defined by the first wall 86, the second wall 88, and the middle portions 98, 100. To put it another way, the duct 36 may be open at the first surface 32 and the second surface 34, and may be enclosed by the first wall 86, the second wall 88, and the middle portions 98, 100.

The base 30 may be monolithic, i.e., a single piece of material with no seams, joints, fasteners, welds, or adhesives holding the bottom portion 82, the first wall 86, the second wall 88, the support ribs 96, and the middle portions 98, 100 together.

The sensor assembly 20 may include a sensor plate 106. The sensor plate 106 may be supported by the second surface 34 of the base 30. For example, the sensor plate 106 may be fixed to base 30 at the second surface 34 with a fastener, an adhesive, a clip, etc. The sensor plate 106 supports the navigation sensors 38. The sensor plate 106 may include various mounting structures, e.g., threaded holes, clips, etc., such that the navigation sensors 38 may by removed and replaced with other navigation sensors 38, e.g., to enable various types of navigation sensors 38 to be used with the sensor assembly 20. The sensor plate 106 may include a tower 108, e.g., to provide a higher elevation of to one of the navigation sensors 38 relative to the others. The sensor plate 106 may include various electrical connections, wires, etc., to provide electrical communication between the navigation sensors 38, and a computer of the vehicle 24, a communication bus of the vehicle 24, etc.

The sensor plate 106 may be free of support from structures other than the base 30. To put it another way, the base 30 may be the only structure supporting the sensor plate 106 on the roof 22. Having the base 30 as the sole support of the sensor plate 106 helps to stabilize the sensor plate 106, e.g., to reduce movement of the sensor plate 106 that may arise from multiple bases supporting the sensor plate 106 and moving relative to each other.

The navigator sensors 38 collect data that may be used to navigate the vehicle 24. For example, the navigation sensors 38 may be radar sensors, scanning laser range finders, light detection and ranging (LIDAR) devices, and image processing sensors such as cameras.

The navigation sensors 38 may be supported by the base 30, e.g., by the second surface 34 of the base 30. The navigation sensors 38 may be supported by sensor plate 106. One or more sensors may be supported by the tower 108. One or more navigation sensors 38 may be in the housing 26, e.g., in the chamber 60 of the housing 26. One or more of the navigation sensors 38 may be positioned to receive light through the lenses 42. To put it another way, each navigation sensor 38 may define a field of view, and the navigation sensors 38 may be positioned such that the fields of view are through the lenses 42.

One or more of the navigation sensors 38 may extend through the opening 76 of the top access panel 74. For example, a LIDAR sensor may be supported by the tower 108 of the base 30 and extend through the opening 76. The sensor assembly 20 may include the wire 40 in electrical communication with one or more of the navigation sensors 38. For example, the wire 40 may be directly connected to one or more navigation sensors 38, and/or may be indirectly connected to one or more of the navigation sensors 38, e.g., via electrical connections of the sensor plate 106, etc. The wire 40 may extend through the duct 36, through the hole 46 of the roof 22, through an a-pillar of the vehicle 24, etc. The wire 40 may be connected to the communication bus of the vehicle 24, or other suitable electrical system for navigating the vehicle 24.

The sensor assembly 20 provides a robust framework for supporting the navigation sensors 38, e.g., to reduce movement of the navigation sensors 38 relative to the vehicle 24. For example, the base 30 may be the only structure fixed to the roof 22 supporting the sensor plate 106, e.g., to eliminate movement of the sensor plate 106 relative to the vehicle 24 that may result from multiple bases supporting a sensor plate and moving relative to each other. As another example, the base 30 and the housing 26 separately seal to the roof 22, e.g., to permit movement of the vehicle 24, e.g., at a periphery of the vehicle 24 and resulting from flex of a body of the vehicle 24, to be transferred to the housing 26 and isolated from the base 30 and navigation sensors 38.

The sensor assembly 20 provides for testing various navigation sensors 38, lenses 42, etc., e.g., to optimize performance and data quality of the sensor assembly 20. For example, the sensor assembly 20 permits the navigation sensors 38 to be serviced or replaced by removing the top access panel 74 and/or the rear access panel 78, e.g., without necessary requiring removal to the housing 26 from the vehicle 24. The navigation sensors 38 may be replaced with navigation sensors 38 of a different type, e.g., permitting empirical testing of the performance of the sensor assembly 20 with various types of navigation sensors 38. As another example, the sensor assembly 20 permits the lenses 42 to be replaced, as discussed above.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
   a roof;
   a housing having a bottom surface sealed to the roof;
   a base in the housing and having a first surface sealed to the roof, a second surface opposite the first surface, and a duct extending from the first surface to the second surface, the base including a bottom portion elongated along a longitudinal axis and having the first surface, and a first wall and a second wall elongated along a lateral axis and extending transversely from the bottom portion and spaced from each other;
   a navigation sensor supported by the second surface; and
   a wire in electrical communication with the navigation sensor and extending through the duct.

2. The vehicle of claim 1, wherein the roof includes an exterior panel, and the housing and the base are sealed to the exterior panel.

3. The vehicle of claim 1, wherein the housing defines an opening and includes a lens releasably secured over the opening, the navigation sensor positioned to receive light through the lens.

4. The vehicle of claim 1, wherein the housing includes a main body that defines an opening at a top of the housing, and a top panel sealed to the main body about a perimeter of the opening at the top of the housing.

5. The vehicle of claim 1, wherein the base is monolithic.

6. The vehicle of claim 1, further comprising a sensor plate supporting the navigation sensor and fixed to the second surface of the base.

7. The vehicle of claim 1, wherein the housing includes a main body that defines an opening at a rear of the housing, and a rear panel secured to the main body and sealed to the main body about a perimeter of the opening at the rear of the housing.

8. The vehicle of claim 1, wherein the roof defines a hole, and the wire extends through the hole.

9. An assembly, comprising:
   a housing designed to seal to a vehicle roof;
   a base in the housing and having a first surface and a second surface opposite the first surface, the base defining a duct extending from the first surface to the second surface, the first surface designed to seal to the vehicle roof about a perimeter of the duct, the base including a bottom portion elongated along a longitudinal axis and having the first surface, and a first wall and a second wall elongated along a lateral axis and extending transversely from the bottom portion and spaced from each other; and
   a navigation sensor supported by the second surface.

10. The assembly of claim 9, wherein the base includes a support rib extending between the bottom portion and the first wall.

11. The assembly of claim 10, wherein the base includes a first middle portion and a second middle portion spaced from each other and extending along the longitudinal axis between the first wall and the second wall.

12. The assembly of claim 11, wherein the first wall, the second wall, the first middle portion and the second middle portion define the duct.

13. The assembly of claim 9, wherein the bottom portion defines a first width and the first wall defines a second width that is the same as the first width.

14. The assembly of claim 9, wherein the housing includes a main body that defines an opening at a top of the housing, and a top panel sealed to the main body about a perimeter of the opening at the top of the housing.

15. The assembly of claim 14, further comprising a second navigation sensor supported by the base, and wherein the top panel defines an opening, the second navigation sensor extending through the opening.

16. The assembly of claim 9, wherein the housing defines an opening and includes a lens releasably secured over the opening.

17. The assembly of claim 9, further comprising a wire in electrical communication with the navigation sensor and extending through the duct.

18. An assembly, comprising:
a housing designed to seal to a vehicle roof;
a base in the housing and having a first surface and a second surface opposite the first surface, the base defining a duct extending from the first surface to the second surface, the first surface designed to seal to the vehicle roof about a perimeter of the duct, the base including a bottom portion elongated along a longitudinal axis and having the first surface, and a first wall and a second wall elongated along a lateral axis and extending transversely from the bottom portion and spaced from each other, the base including a support rib extending between the bottom portion and the first wall, the base including a first middle portion and a second middle portion spaced from each other and extending along the longitudinal axis between the first wall and the second wall, the first middle portion including an outer surface and defining a cavity extending from the outer surface toward the duct; and
a navigation sensor supported by the second surface.

19. The assembly of claim 18, wherein the cavity terminates prior to the duct.

* * * * *